United States Patent
Jafari

(10) Patent No.: US 10,665,998 B1
(45) Date of Patent: May 26, 2020

(54) CABLE THROUGH PANEL FEEDTHROUGH CONNECTOR WITH RELEASE BUTTONS

(71) Applicant: HAMPTON ELECTRIC, LLC, Carson, CA (US)

(72) Inventor: Afshin Jafari, Redondo Beach, CA (US)

(73) Assignee: HAMPTON ELECTRIC, LLC, Carson, CA (US)

( * ) Notice: Subject to any disclaimer, the term of this patent is extended or adjusted under 35 U.S.C. 154(b) by 0 days.

(21) Appl. No.: 16/223,914

(22) Filed: Dec. 18, 2018

(51) Int. Cl.
| | |
|---|---|
| *H02G 3/06* | (2006.01) |
| *H01R 13/74* | (2006.01) |
| *H01R 9/05* | (2006.01) |
| *H01R 13/627* | (2006.01) |
| *H01R 24/56* | (2011.01) |

(52) U.S. Cl.
CPC ......... *H01R 13/743* (2013.01); *H01R 9/0524* (2013.01); *H01R 9/0527* (2013.01); *H01R 13/6271* (2013.01); *H01R 24/564* (2013.01)

(58) Field of Classification Search
CPC .......................... H02G 3/0608; H02G 3/0666
USPC .................. 174/450, 663, 665, 666; 439/557
See application file for complete search history.

(56) References Cited

U.S. PATENT DOCUMENTS

| | | | | |
|---|---|---|---|---|
| 3,573,716 A | * | 4/1971 | Garver ................ | H01R 13/743 439/557 |
| 4,012,578 A | * | 3/1977 | Moran ................ | H02G 3/0616 174/51 |
| 4,156,103 A | * | 5/1979 | Dola ................... | H02G 3/0641 174/652 |
| 4,245,879 A | * | 1/1981 | Buck .................. | H01R 13/627 439/345 |
| 4,885,429 A | * | 12/1989 | Schnittker ........... | H02G 3/0691 174/668 |
| 6,114,630 A | | 9/2000 | Gretz | |
| 6,140,582 A | * | 10/2000 | Sheehan ............. | H02G 3/0683 16/2.1 |
| 6,194,661 B1 | | 2/2001 | Gretz | |
| 6,444,907 B1 | * | 9/2002 | Kiely ................. | H02G 3/0691 16/2.2 |
| 6,589,076 B1 | * | 7/2003 | Davis ................. | H01R 13/741 439/557 |
| 6,670,553 B1 | | 12/2003 | Gretz | |
| 6,682,355 B1 | * | 1/2004 | Gretz ................. | H02G 3/0691 174/663 |
| 7,077,698 B2 | * | 7/2006 | Matthys .............. | H01R 13/745 439/557 |

(Continued)

FOREIGN PATENT DOCUMENTS

WO 2013172879 A1 11/2013

*Primary Examiner* — Neil Abrams
(74) *Attorney, Agent, or Firm* — Lewis Roca Rothgerber Christie LLP

(57) ABSTRACT

The present invention is a connector for connecting an electrical cable having cladding to an aperture in an electrical panel. The assembled connector has a spring, a shell, and a insulator along a longitudinal axis. The spring has a base from which two insertion tabs extend coaxial with the axis and the shell has two side walls to prevent over-insertion of the cladding into the connector. The insertion tabs of the spring have hook latches extending past the insulator that lock the connector in the panel, and the insulator has pressure buttons for flexing the insertion tabs during insertion and removal of the connector to the electrical panel.

19 Claims, 4 Drawing Sheets

(56) References Cited

U.S. PATENT DOCUMENTS

| | | | |
|---|---|---|---|
| 7,094,099 B2 * | 8/2006 | Daggett | H01R 13/6273 439/544 |
| 7,148,431 B2 | 12/2006 | Pyron | |
| 7,151,223 B2 * | 12/2006 | Auray | H01R 4/646 174/70 R |
| 7,358,448 B2 | 4/2008 | Auray et al. | |
| 7,390,979 B1 | 6/2008 | Johnson | |
| 7,432,452 B2 * | 10/2008 | Gardner | H01R 24/564 16/2.1 |
| 7,476,817 B1 | 1/2009 | Shemtov | |
| 7,554,041 B2 | 6/2009 | Ducret | |
| 7,576,290 B1 * | 8/2009 | Korcz | H02G 3/0691 16/2.1 |
| 7,824,213 B1 * | 11/2010 | Korcz | H01R 13/5816 174/64 |
| 7,935,886 B2 | 5/2011 | Jafari | |
| 8,350,163 B2 * | 1/2013 | Auray | H02G 3/0691 174/650 |
| 8,476,541 B1 * | 7/2013 | Kiely | H02G 3/081 174/656 |
| 8,791,377 B2 * | 7/2014 | Jafari | H02G 3/0691 174/660 |
| 9,231,388 B2 * | 1/2016 | Chavan | H02G 1/00 |
| 9,705,296 B1 * | 7/2017 | Smith | H02G 3/083 |
| 9,866,001 B2 * | 1/2018 | Jafari | H02G 3/0691 |
| 10,312,643 B2 * | 6/2019 | Jafari | H01R 13/743 |
| 10,367,344 B2 * | 7/2019 | Smith | H02G 3/0691 |
| 2004/0177988 A1 | 9/2004 | Kiely | |
| 2004/0251682 A1 * | 12/2004 | Pyron | F16L 5/027 285/140.1 |
| 2010/0084854 A1 | 4/2010 | Sathyanarayana et al. | |
| 2011/0290550 A1 * | 12/2011 | Kiely | H02G 3/0691 174/480 |
| 2013/0056263 A1 | 3/2013 | Chavan et al. | |

* cited by examiner

CABLE THROUGH PANEL FEEDTHROUGH CONNECTOR WITH RELEASE BUTTONS

BACKGROUND OF THE INVENTION

Technical Field

The present invention relates generally to connectors for connecting electrical cables and flexible conduits to electrical panels, and more particularly to an improved connector that allows easier insertion of the connector into the panel and precise positioning of the conduit of the cable within the connector.

Background Art

The present invention relates to connectors for connecting electrical cables having flexible conduits to electrical panels. The invention is an improved connector that allows easier insertion of the electrical cables into a trailing end of the connector and the connector into the electrical panel, and providing precise positioning of the flexible conduit within the connector so that the conductors of the cable can easily pass through the connector into the panel.

Historically, armored cable (AC) or metal-clad cable (MC) has been connected to a panel by a tubular connector including a leading end having a threaded nose and a trailing end having a lateral screw mounted laterally through the connector wall or a set of strap screws attached to the trailing end. The threaded nose was inserted into an aperture in the panel and a locknut tightened thereon to secure the connector to the panel. AC or MC cable was then inserted into the trailing end and the lateral screw or the strap screws were tightened to secure the cable to the connector. It is important to secure grounding and since the connector is made out of metallic material it creates a good electrical continuity (grounding) between the electrical panel and the cable.

Typically in electrically wiring a construction project, whether it is a building or factory, requires electrical contractors to make hundreds to thousands of such connections. Moreover, such installation necessitates using tools to achieve a secure connection, including a wrench on the lock nut and a screwdriver on the laterally mounted screw. Therefore, it should be appreciated that completing all of these connections can be very time consuming, when contractors usually use such mentioned tools on each connection.

Recently several types of snap engagement connectors have been introduced as a means of connecting cables to electrical junction boxes in order to reduce the time and effort required for installation of connectors in electrical wiring. Although using the aforementioned snap engagement connectors eliminates using tools for installation, they typically require a lot of effort to snap them on the junction box. Furthermore, if there is a need for a retrofit or disconnection of the connector, the contractors have no choice but using a tool to remove the snap engagement connectors and that in turns involves a lot of effort and force. In addition, such connectors were difficult to operate due to the cladding interfering with the snap mechanism and did not allow the conductors of the cable to easily pass through the connector Therefore, what is needed is a connector for securing electrical cables to the junction box and the type that does not require the use of any tools for installing or removal, at either the leading or trailing end, and that allows the leading end to connect quickly and securely to the electrical junction box and the cable to be securely fitted into the trailing end. Such a connector would vastly reduce the time and effort involved for installing or removing electrical cables in a structure wiring. The desired connectors must be additionally designed to work with standard electrical panels, boxes, housings, etc., while allowing quick and easy connection with standard size knockout apertures and be designed to operate efficiently without interference by the cladding.

BRIEF SUMMARY OF THE INVENTION

Accordingly, the present invention is an improved connector for connection of electrical cables having flexible conduit to electrical junction boxes and panels. An embodiment of the present invention is a connector for connecting an electrical cable to an aperture in an electrical panel. The connector includes a spring, a shell, and an insulator that collectively have a longitudinal central axis when the connector is assembled. The spring is cylindrical and has a base from which two insertion tabs extend and bend around the longitudinal central axis. The base has a pressure prong extending axially from the base. Two flexible support tabs are positioned alongside of the insertion tabs around the longitudinal central axis joining together to form the cylinder. The two insertion tabs extend from either side of the base and the two support tabs are opposite the base. The support tabs, insertion tabs and the pressure tab form the cylindrical profile conforming to the shell. It is to be understood that the connector components could also have a square, rectangular or other shaped profile. The two side insertion tabs and the pressure prong each have a prong bent inward with jugged-in sections and free end tips for engaging the cladding. The shell has at least one clad blocking wall located within the shell to engage an end of the cladding.

The insertion tabs are bent to form spring sections. The spring sections pop out of side openings in the shell to press and release the spring inside and out of the aperture hole of the panel. The insertion tabs have free end tips and each tip has two side extensions bent at an angle to form hook latches. The resilient insertion tabs push the hook latches against the inner wall of the panel. When the connector is pushed through the panel aperture, the hook latches slide over the edge of the opening against spring force of the insertion tabs and the latches snap into the aperture such that the side sections abut the panel around the aperture. The hook latches are directed away from the axis to extend into the aperture and snappingly lock the connector in the aperture. The insulator has a raised pressure button positioned directly over each of the spring sections of the insertion tabs for ease of applying pressure to the spring section to operate the hook latches during insertion and removal of the connector to the panel.

The pressure tab has a pressure prong on the tab that is bent away from the axis with the free end tip either toward the trailing end or alternatively bent with the free end tip toward the leading end. The pressure tab pressure prong pushes against the shell nose and the resultant radial force provides better electrical conductivity and hence better grounding between the panel, shell, and spring.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which:

FIG. 2 is an isometric view of the electrical connector, junction box or panel, and cable of FIG. 1, wherein FIG. 2 shows these elements after connection.

DETAILED DESCRIPTION OF THE DRAWINGS

Figure 1:
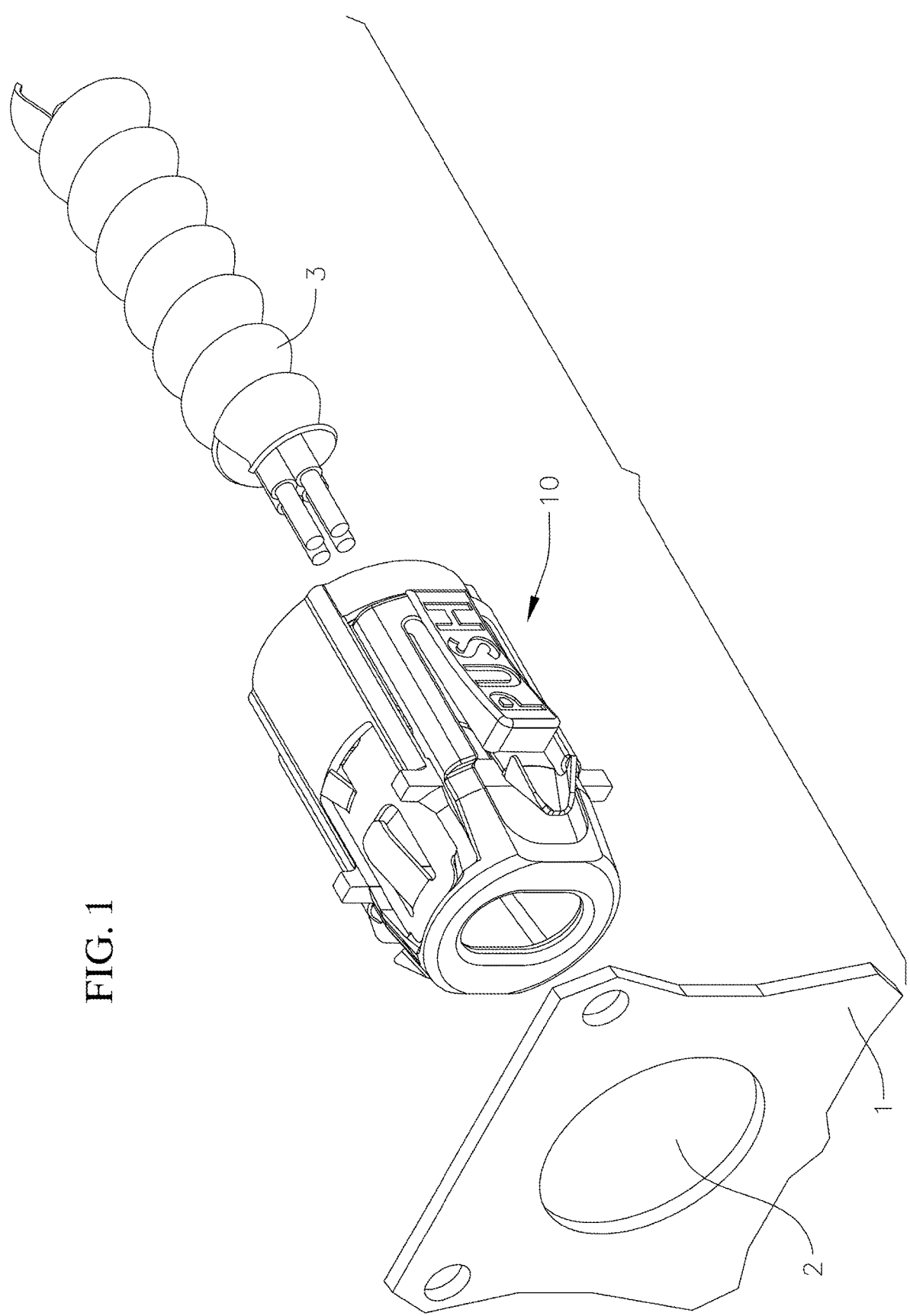
FIG. 1 is an isometric view of an exemplary embodiment of an electrical connector according to the present invention that is aligned with a junction box or panel at a knock out hole or aperture and also aligned with an electrical cable prior to connection.
Figure 2:
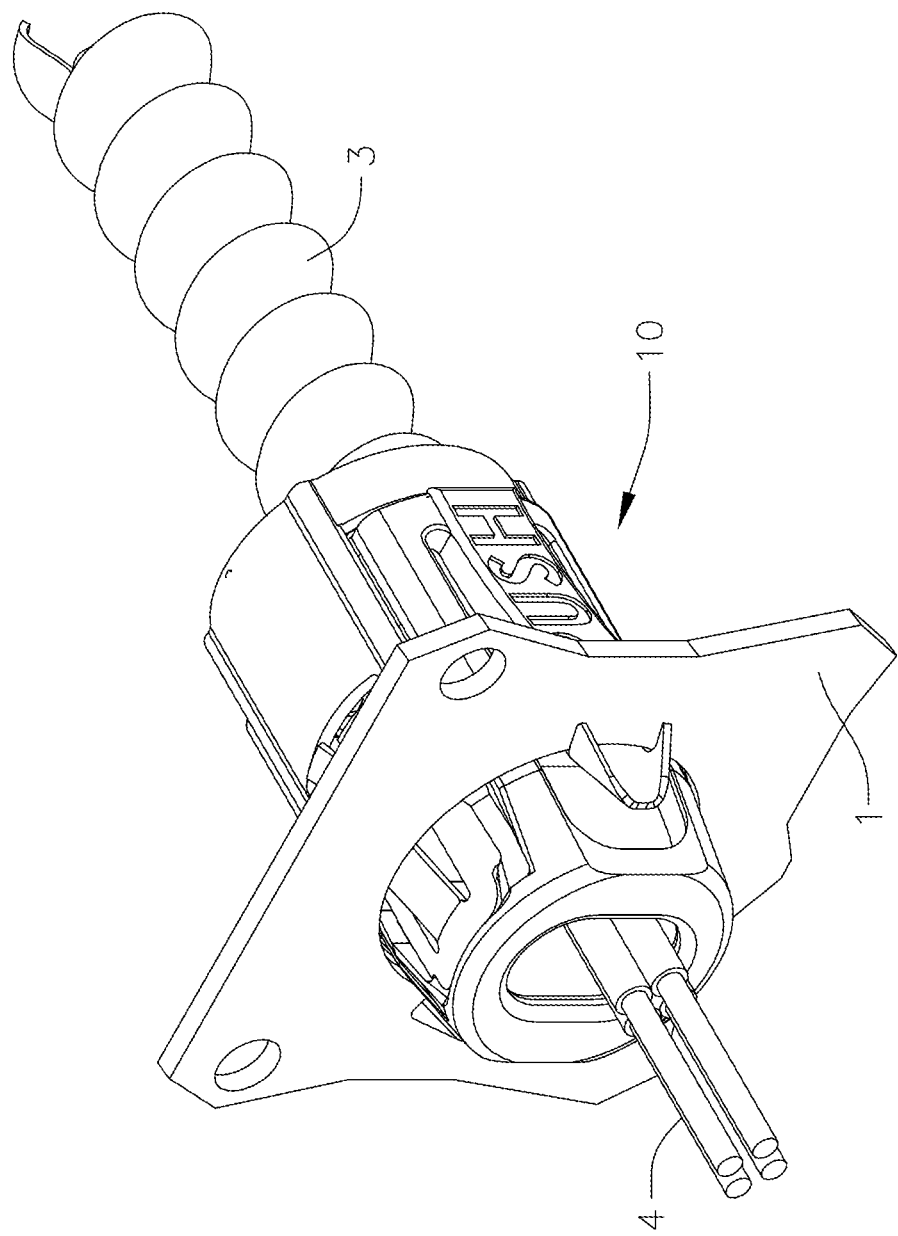

An embodiment of the present invention is an electrical connector 10 as illustrated in FIGS. 1-4. FIG. 1 is an isometric view of the connector 10 aligned with a knock out hole or aperture 2 in an electrical panel 1 and with an electrical cable 3 prior to connection. FIG. 2 is an isometric view of the connector 10 after connection. As can be seen in these figures, the connector 10 secures into the aperture 2 of the panel 1 and securely receives the cable 3. In practice, the cable 3 will support a plurality of electrical wires 4, which may be already present in the cable 3 or installed through the cable 3 later.

The transition from the pre-connection state in FIG. 1 to the post-connection state in FIG. 2 involves two operations. The cable 3 is pressed into locking engagement with the connector 10, and then the connector 10 is snapped into locking engagement in the aperture 2 of the panel 1. Alternately, the order of these operations can be reversed, snapping the connector 10 into the aperture 2 and then pressing the cable 3 into the connector 10. How the connector 10 facilitates these snap and press together operations is discussed in detail, presently. It is helpful, however, to appreciate now and throughout this discussion that these operations are manual, here meaning that they can be performed entirely by hand and without any tools. The snap and press insertions here are also essentially linear operations, that is, not requiring any rotational screwing or locking together of pieces to employ the connector 10.

Figure 3:
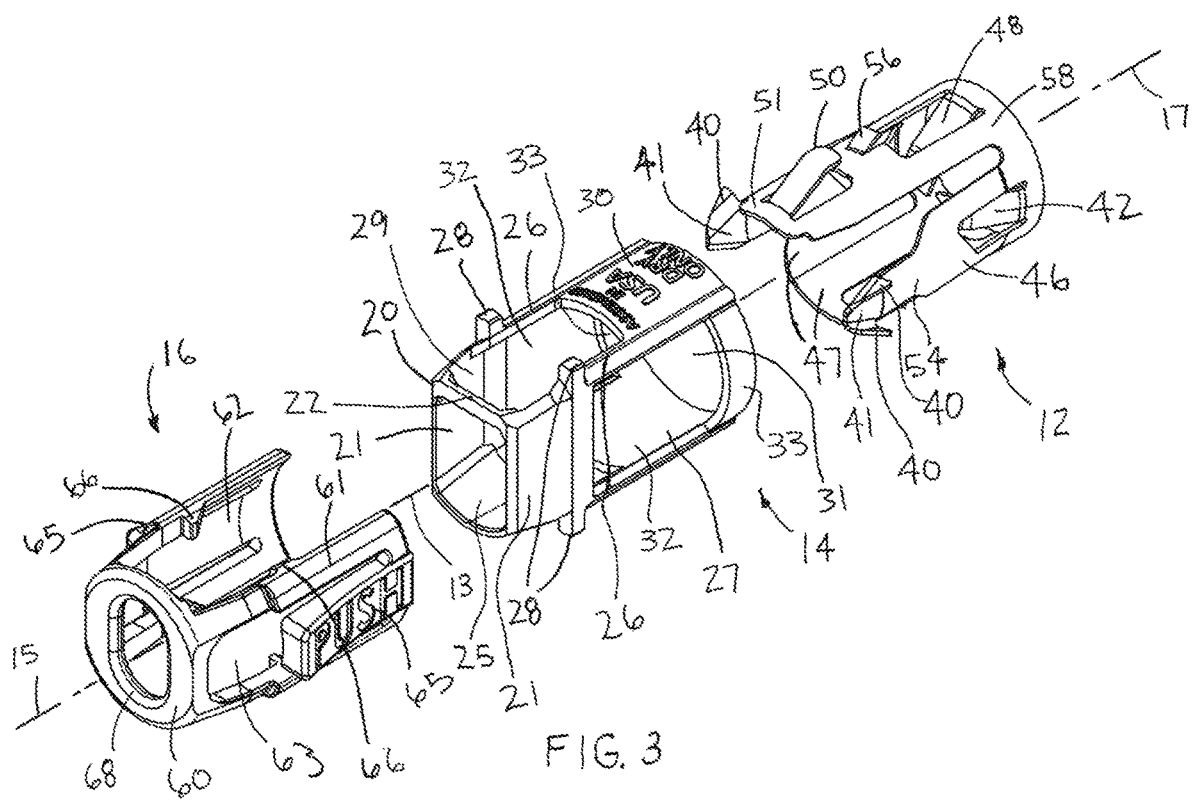
FIG. 3 is an exploded isometric view of the connector of FIG. 1.
Figure 4:
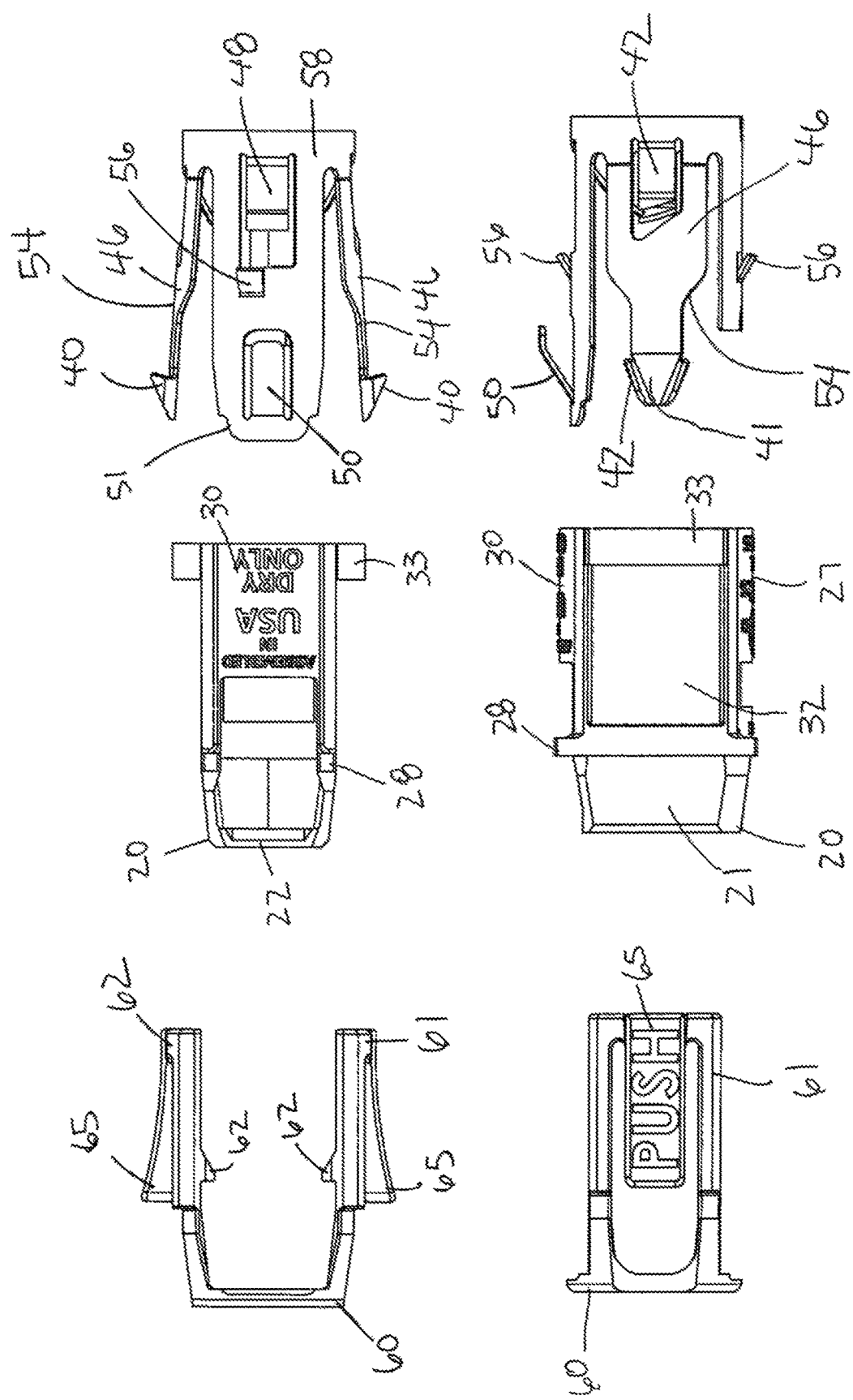
FIG. 4 is an exploded side view, shown on the top of the Figure and an exploded top view, shown on bottom of the Figure of the connector of FIG. 3.

FIG. 3 is an exploded isometric view of the connector 10. As shown, the connector 10 comprises a spring 12, a shell 14, and an insulator 16. Collectively these components have a longitudinal axis 13, as shown.

The spring 12 is preferably made of die-stamped and formed metal (e.g., from galvanized steel sheet), the shell 14 is made of molded plastic (polycarbonate) or cast metal (e.g., aluminum, zinc, or pots metal), and the insulator 16 is made of molded plastic (e.g., polycarbonate), although neither these particular materials or these manners of forming them are requirements.

The spring 12 is resilient and electrically conducting, and has a base 58 that extends to form a pressure tab 51 as a base support for a pressure prong 50. Two insertion tabs 46 are positioned on either side of the base 58. Two more tabs further extend from opposite sides of the insertion tabs around longitudinal central axis joining together opposite from the base forming support tabs 47. The insertion tabs, support tabs, base and pressure tab form a cylindrical profile conforming to the shell housing. The two side insertion tabs 46 each have one or more gripping prongs 42 bent inward with jugged-in sections and free end tips. The base 58 also has a similar gripping prong 48 with a free end tip bent at an angle towards the central axis 13. The insertion tabs 46 are bent to form spring buttons 54. The spring buttons pop out of the shell side openings 32 to press and release the spring 12 inside and out of the aperture hole 2. The insertion tabs have free end tips 41 and each tip has two side extensions barbs 40 bent at an angle to form hook latches. The resilient insertion tabs push the extension barbs 40 against the inner wall of the panel 1. When the connector is pushed through the panel aperture 2, the extension barbs 40 slide over the edge of opening against spring force of the insertion tabs 46. When they pass the over the edge of aperture 2, the spring force pushes and the insertion barbs snap into the aperture such that the extension barbs abut the panel around the aperture 2. The extension barbs 40 are directed away from the axis to extend over the inside surface of the panel 1 and snappingly lock the connector 10 in the aperture 2.

The spring base 58 has the pressure tab 51 extending toward the leading end of the connector along the central axis. The pressure prong 50 on the pressure tab is bent away from the axis with a free end tip either toward the trailing end (shown in this embodiment) or alternatively bent with the free end tip toward the leading end. The spring 12 has two combined spring actions, wherein the insertion tabs 46 perform latching to the aperture 2 and the pressure tab 51 provides necessary pressure via prong 50 engaging the aperture providing a radial force to securely ground the connector 10. Insertion tabs 46 and pressure tab 51 together provide grounding continuation through cable 3.

The base 58 and the insertion tabs 46 nominally conform to the inner cylindrical shape of the shell 14 to permit insertion of cable 3. The base 58 is at a defined trailing end 17 of the connector 10, thus also defining an opposite leading end 15 of the connector 10.

The two insertion tabs 46 can be the same in general shape. Each extends, as shown, from opposite sides of the base 58 around the longitudinal axis. The insertion tabs 46 have a extruded section that forms the spring button 54, described presently. The insertion tabs 46 are further each extended to form the respective free end tips 41. The free end tips 41 have the two angled barbs 40 on the side of the free end tip, as shown. As also shown, the barbs 40 can optionally have a triangular or curved cutout between adjacent pairs to permit better grip on the inner wall of a panel 1. The corners of barbs 40 can also operate to penetrate through a paint or oxidation layer on the inner wall of the panel, to reach an underlying metal wall material of the panel 1 and thus provide better electrical conductivity and grounding.

Two locking tabs 56 bend outward from the pressure tab 51 and the support tab 47, one on either tab, to secure the spring inside the shell and preventing it from pulling out. Each insertion tab 46 provides a base from which one or more prongs extend inwardly at an angle less than 90 degree to form side gripping prongs 42. The two gripping prongs 42 can also have the same shape, but preferably there are minor differences to facilitate better engagement with the spiral or helix shaped sides of a cable 3. An inward bent prong from base 58 forms the gripping prong 48. The respective prongs in each of these sets can also be the same in size and degree of inward bend, but can be slightly different and are not axially aligned to facilitate better engagement with the spiral or helix shaped sides of the cladding of cable 3, and thus better securing the cable 3 inside the connector 10, providing better electrical conductivity and grounding.

A second component of the connector 10 is the shell 14. It is rigid, typically also electrically conducting or not, and, as shown, it has a nominally cylindrical cross section. The shell 14 has a base 27, two support columns 26, one trailing bridge 30, and two trailing side bridges 33 forming the trailing opening 31. Further the base 27 and two columns 26 terminate into four perpendicular bosses 28 forming a base for the leading nose 20. Two opening windows 32 are positioned along the sides of this shell through which spring buttons 54 protrude out, and an opening 29 is positioned on top of the shell through which the spring pressure tab 51 passes. The leading nose 20 extends out of bosses 28 towards the leading end 15 shown in FIG. 3 forming a flat base 22 to support an end of the spring pressure tab 51. The two opening windows 32 are where the free end tips 41 and barbs 40 extend outwardly. The leading nose 20 forms a collar that sits against the aperture 2 and it has a forward opening 25 through which the electrical conductors (not shown) of the cable 3 passes. The leading nose 20 has flat side walls 21 that extend from the leading edge to just below bosses 28. Trailing edge of walls 21 serve as clad stopping edges to prevent over insertion of the cladding of cable 3 and prevents interference by the cladding with the operation of the insertion tabs. The hole 25 further is partially covered by the insulator 16.

A third component of the connector 10 is the insulator 16. It has two guiding bodies 61 and 62 extending out of ring or base 60 having a circular or oval opening 68. The guiding bodies 61 and 62 slide over and engage the insertion tabs 46 positioned in openings 32 of the shell 14. Guiding bodies 61 and 62 have openings 63 for passage of the hook latches of the insertion tabs. Guiding bodies 61 and 62 have a raised pressure button 65 which engages spring button 54 on insertion tabs 46. Pressure buttons 65 extend from the trailing edge of the insulator and flex to allow increased pressure to be applied to the spring buttons 54 to easily engage and disengage the connector from the panel.

To assemble the embodiment of the connector 10 depicted in FIG. 3 the spring 12 is inserted in a first operation into the through opening 31 of the shell 14 and then the insulator 16 is inserted over the shell 14 so that the guide bodies engage the insertion tabs. The guide bodies have barbs which engage the lower surface of side walls 21 of shell 14. The first insertion operation includes inwardly displacing the spring buttons 54 of the insertion tabs 46 sufficiently to permit passage of the insertion tabs 46 between the side bridges 33 of the shell 14. At the same time, the pressure tab 51 slides underneath trailing bridge 30 and sits over flat base 22 of shell 14. A final press slides the spring 12 tightly inside shell 14. Once the spring 12 is brought to its final position in the shell 14, the two locking tabs 56 snap out of openings 29 on shell 14 fitting spring 12 firmly inside shell 14 securing strong electrical conductivity and grounding between spring 12 and shell 14. Once the spring 12 is brought to its final position in the shell 14, the two spring buttons 54 pop out of openings 32 and the insertion tabs spring back displacement constrains free end tips 41 on each insertion tab 46 against side walls 21, thus trapping the spring 12 in the shell 14. In this manner the pressure buttons 65 and spring buttons 54 are used as fit buttons during assembly (and can be used as release buttons for disassembly).

The second insertion operation includes snapping the insulator 16 into the sub-assembly of the shell 14 and spring 12. The insulator 16 is passed over the leading nose 20, sliding two guiding bodies 61 and 62 over side walls 21 with the barbs 66 of the insulator 16 against the lower edge of walls 21 in opening 32 of the shell 14, thus locking the insulator 16 within the sub-assembly of the shell 14 and spring 12.

To connect the connector 10 to a panel 1, the pressure buttons 65 are pressed which in turn presses the spring buttons 54 of the insertion tabs 46 inwardly moving the free end tips 41 and barbs 40 enough to pass the leading end 15 of the connector 10 into an aperture 2. When then released, the insertion tabs 46 bounce back, outward, to grip into the inner wall of the panel 1 through barbs 40.

To connect a cable 3 to the connector 10, the cable 3 is pushed through the hole 31 at the trailing end 17 of the connector 10, until an end of the cladding of the cable 3 abuts against the trailing edge of side walls, where it is then locked into place by the grip of the prongs (e.g., by the prongs 48 of base 58, and prongs 42 of insertion tabs 46). The trailing edge of side walls 21 prevent the cladding of the cable from interfering with the operation of insertion tabs 46 and allow conductors (electrical wires 4) to freely pass through opening 68.

To disconnect the connector 10 from the panel 1, the pressure buttons 65 of the insulator are again pressed, thus inwardly moving and disengaging the free end tips 41, disengaging barbs 40 enough to remove the leading end 15 of the connector 10 from the aperture 2. To disconnect the connector 10 from the cable 3, the connector 10 can be rotated counter-clockwise to unscrew the connector 10 from the cable 3 (since the prongs 42 and 48 are in screw-thread-like engagement with the spiral groove of the cable 3).

In summary, it can now be appreciated that the connecting and disconnecting of a cable 3 to panel 1 with the connector 10 can be entirely manual, requiring little effort and no tools. The linear connecting operations of squeezing and inserting a connector into knock out hole or aperture and pressing a cable into the connector permitted by the present connector 10 should especially permit time savings during electrical construction. Similarly, to the extent rarely ever needed, the linear disconnecting operation of squeezing and withdrawing the present connector 10 from a knock out hole or aperture and the rotational disconnecting operation of unscrewing the present connector 10 from a cable will also permit time savings over the use of other types of connectors.

The present invention offers a quick connect connector for an electrical junction box or panel that requires no tools for connection or removal of the connector. Moreover, it needs much less effort and force for installation or removal compared to the existing snapping connectors.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A connector for connecting a cladded electrical cable to an aperture in an electrical panel, comprising:
   a one piece spring positioned within a shell having a longitudinal central axis extending therethrough;
   the spring having a base from which two side insertion tabs bend around the longitudinal central axis wherein the insertion tabs springingly move within the shell;

the insertion tabs of said spring having latches extending outside of the shell to snappingly lock the connector in the panel when axially pressed into the aperture; and the base of said spring further having a hole to receive the cable when axially pressed into the connector, and a plurality of clamping tabs to lock the cable in the connector by linear insertion and engagement of the cladding;

the shell having side walls with a lower edge to engage an end of the cladding to prevent over insertion of the electrical cable within the spring and interference with operation of the insertion tabs; and an insulator having flexible pressure buttons to engage the insertion tabs to flex the insertion tabs for insertion and removal of the connector to the electrical panel.

2. The connector of claim 1, wherein the panel has wall material proximal to the aperture and the latches of said insertion tabs of said spring each have at least one corner oriented to grip into the wall material of the panel.

3. The connector of claim 1, wherein the cable has a spiral or helix shaped side and the plurality of clamping tabs are differently sized and not axially aligned to clamp against the spiral or helix shaped side of the cable.

4. The connector of claim 1, wherein the spring includes a pressure tab extending from the base along to the two side insertion tabs, wherein the pressure tab has a pressure prong to provide a radial ground force for the connector.

5. The connector of claim 1, wherein the pressure buttons are positioned on guide bodies on the insulator.

6. The connector of claim 5, wherein the guide bodies have a barb for connecting the insulator to the shell.

7. The connector of claim 4, wherein the pressure tab has a locking tab to lock the spring to the shell.

8. A connector for connecting an electrical cable having cladding to an aperture in an electrical panel, comprising:

a one piece spring positioned within a shell having a longitudinal central axis extending therethrough;

the spring having a base from which two side insertion tabs bend around the longitudinal central axis;

the shell having a clad blocking wall extending into an interior cavity of the spring for engagement of an end of the cladding to prevent over insertion of the cladding of the electrical cable into the connector;

the shell having side openings, wherein said insertion tabs springingly extend out of the through opening of the shell;

the insertion tabs of said one piece spring having latches to snappingly lock the connector in the panel when axially pressed into the aperture;

the base of said spring further having a hole to receive the electrical cable when axially pressed into the connector, and a plurality of clamping tabs to lock the cable in the connector; and the spring includes a pressure tab extending from the base between to the two side insertion tabs, wherein the pressure tab has a pressure prong to provide a radial grounding force for the connector.

9. The connector of claim 8, wherein said spring is made of sheet metal.

10. The connector of claim 8, wherein the panel has wall material proximal to the aperture and the latches of said insertion tabs of said spring each have at least one perpendicularly extending barb to grip into the wall material of the panel.

11. The connector of claim 8, wherein the cable has a spiral or helix shaped side and the plurality of clamping tabs are differently sized and not axially aligned to clamp against the spiral or helix shaped side of the cable.

12. The connector of claim 8, further comprising an insulator having pressure buttons positioned over the two side insertion tabs.

13. The connector of claim 12, wherein the pressure buttons are flexibly connected to guide bodies on the insulator.

14. A connector for connecting an electrical cable having cladding to an aperture in an electrical panel, comprising:

a one piece spring positioned within a shell having a longitudinal central axis extending there through;

the spring having a base from which two side insertion tabs bend around the said axis, and the shell having an opening through which the insertion tabs extend;

the insertion tabs of said one piece spring having latches extending outside of the shell to snappingly lock the connector in the panel when axially pressed into the aperture; and an insulator having pressure buttons to engage the insertion tabs for flexing the insertion tabs during insertion and removal of the connector to the aperture in the electrical panel.

15. The connector of claim 14, wherein said spring is made of sheet metal.

16. The connector of claim 14, wherein the panel has wall material proximal to the aperture and the latches of the insertion tabs of said spring each have at least one perpendicularly extending barb to grip into the wall material of the panel.

17. The connector of claim 1, wherein the cable has a spiral or helix shaped side and the plurality of clamping tabs are differently sized and axially spaced to clamp against the spiral or helix shaped side of the cable.

18. The connector of claim 14, wherein the two side insertion tabs each have a locking tab to lock the spring to the shell.

19. The connector of claim 14, wherein the shell has two side walls having a trailing edge to engage the cladding to prevent over insertion of the electrical cable into the connector.

* * * * *